(12) United States Patent
Hedstrom et al.

(10) Patent No.: US 11,974,173 B2
(45) Date of Patent: Apr. 30, 2024

(54) WIRED TELEPHONE TO VOLTE ADAPTER

(71) Applicant: BrightSky, LLC, Naples, FL (US)

(72) Inventors: Mark David Hedstrom, Naples, FL (US); Taylor Jonathan Stroobosscher, Estero, FL (US); Matthew Terry Miller, Bonita Springs, FL (US); John Nicholas Shevillo, Naples, FL (US)

(73) Assignee: Brightsk, LLC, Naples, FL (US)

( * ) Notice: Subject to any disclaimer, the term of this patent is extended or adjusted under 35 U.S.C. 154(b) by 0 days.

(21) Appl. No.: 17/929,133

(22) Filed: Sep. 1, 2022

(65) Prior Publication Data

US 2023/0062629 A1    Mar. 2, 2023

Related U.S. Application Data

(60) Provisional application No. 63/240,066, filed on Sep. 2, 2021.

(51) Int. Cl.
    H04M 3/00 (2006.01)
    H04M 5/00 (2006.01)
    (Continued)

(52) U.S. Cl.
    CPC ....... H04W 36/0022 (2013.01); H04M 9/082 (2013.01); H04N 1/32713 (2013.01)

(58) Field of Classification Search
    CPC ............. H04M 7/006; H04M 2207/20; H04M 15/8044; H04M 1/2535; H04M 7/0069; H04M 2207/14; H04M 2215/42; H04M 2215/745; H04M 7/121; H04M 11/00; H04M 15/56; H04M 11/066; H04M 1/725; H04W 92/02; H04W 88/06; H04W 84/045; H04W 88/16; H04W 88/08;
    (Continued)

(56) References Cited

U.S. PATENT DOCUMENTS 5,682,417 A * 10/1997 Nitta ................. H04W 52/0225
                                                    455/574
2002/0080730 A1* 6/2002 LeBlanc ................. H04L 47/10
                                                    379/406.01
(Continued)

OTHER PUBLICATIONS

PCT/US2022/075874, International Search Report and Written Opinion, dated Dec. 2, 2022.

*Primary Examiner* — Kharye Pope
(74) *Attorney, Agent, or Firm* — Jeffrey N. Giunta; Fleit Intellectual Property Law

(57) ABSTRACT

Systems and methods for a radio communications device supporting LTE cellular communications. A device includes a data interface configured to exchange modem control commands and audio data with an LTE cellular modem and a telephone interface configured to provide a two-wire analog telephone interface for connection to a telephone device. A controller control signals provided via the telephone interface to manage voice call operations with the telephone device; exchange digital voice data corresponding to voice signals exchanged with the telephone device via the telephone interface; exchange control information via the data interface to establish and manage a voice over LTE cellular call; and exchange the digital voice data via the voice over LTE cellular call via the LTE cellular modem.

20 Claims, 6 Drawing Sheets

(51) Int. Cl.
*H04M 9/08* (2006.01)
*H04N 1/327* (2006.01)
*H04W 36/00* (2009.01)
*H04W 76/16* (2018.01)

(58) Field of Classification Search
CPC ......... H04W 36/0011; H04W 36/0022; H04W 88/02; H04W 48/18; H04L 63/0853; H04L 61/5007; H04L 65/102
See application file for complete search history.

(56) References Cited

U.S. PATENT DOCUMENTS

| | | | |
|---|---|---|---|
| 2004/0203680 A1* | 10/2004 | Sylvain | H04W 48/18 455/422.1 |
| 2005/0009560 A1* | 1/2005 | Cavill | H04N 1/00281 455/556.1 |
| 2007/0049329 A1* | 3/2007 | Mayer | H04W 48/18 455/552.1 |
| 2011/0044318 A1* | 2/2011 | Sharma | H04L 12/2825 370/352 |
| 2011/0171940 A1* | 7/2011 | Dinur | H04W 48/18 455/414.1 |
| 2014/0169535 A1* | 6/2014 | Smith | H04M 11/04 379/45 |
| 2015/0161644 A1* | 6/2015 | Bamane | G06Q 30/0226 705/14.27 |
| 2016/0294706 A1* | 10/2016 | Lang | H04L 63/0853 |

* cited by examiner

WIRED TELEPHONE TO VOLTE ADAPTER

FIELD OF THE DISCLOSURE

The present disclosure generally relates to communications system interconnections, and more particularly to interfacing wired communications to a different communication system interface.

BACKGROUND

Many existing facilities include an internal telephone infrastructure that use twisted pair copper wire to connect telephone devices to an external telephone service connection. Such systems are often referred to as Plain Old Telephone Service (POTS) and have historically been provided by local Regional Bell operating companies (RBOCs) or equivalent public utility telephone operating companies. Such systems use various types of signaling, such as ring voltages and circuit interruptions, to perform signaling and control of a telephone voice call. The public utility telephone operating companies are discontinuing the provision of POTS, thereby leaving the existing installed infrastructure without an ability to perform communications outside of the facility.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
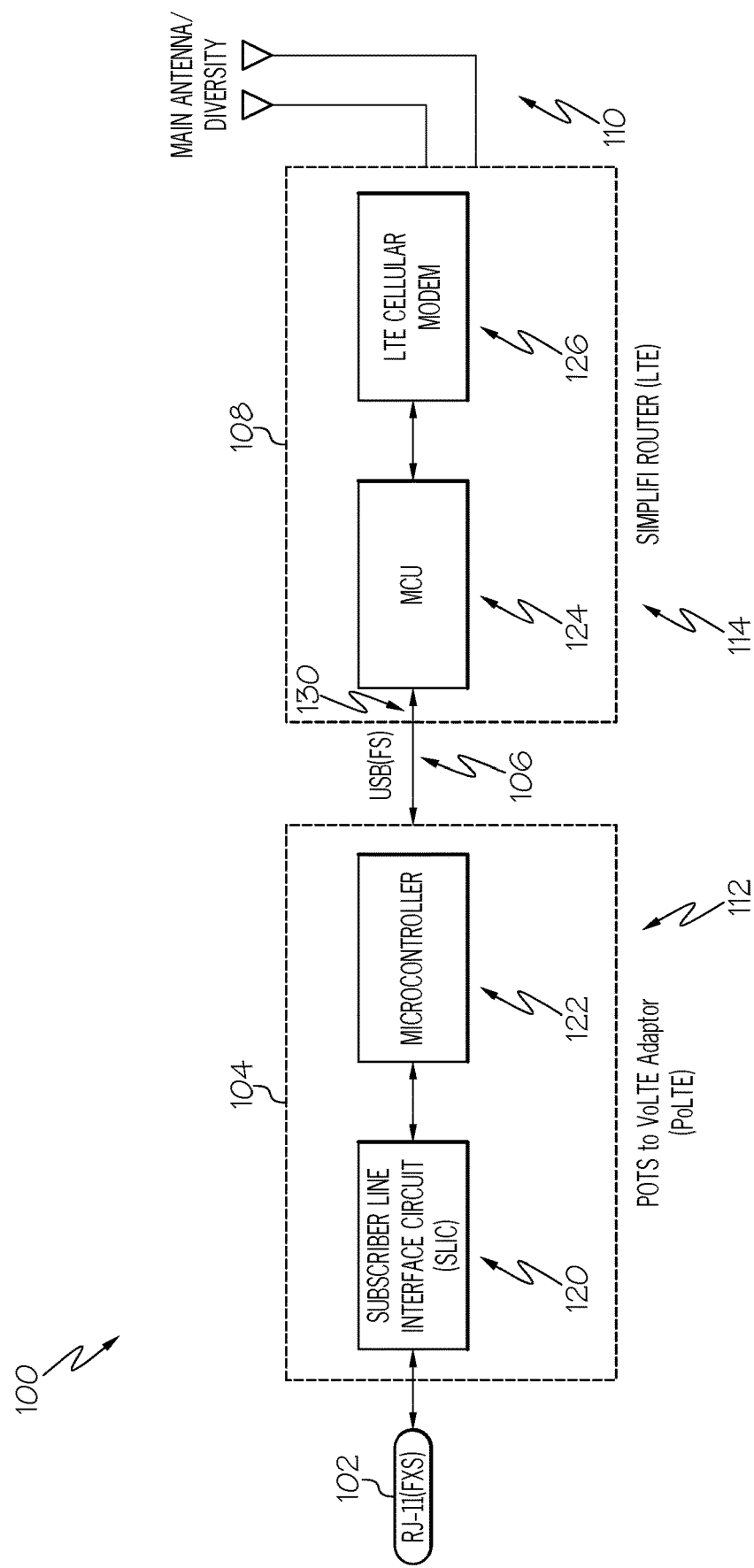
FIG. 1 depicts a block diagram of a Plain Old Telephone Service (POTS) over LTE (PoLTE) service adapter system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide an interface between exiting POTS infrastructures, such as are installed in existing facilitates, and LTE based telecommunications networks. In order to allow existing facilities to use their internal POTS infrastructure, the below described systems and methods in an example provide a small, portable USB to RJ-11 adapter that is designed to replace connections to external conventional plain old telephone service (POTS) lines, via an RJ-11 jack of the RJ-11 adapter, as have been provided by public utility telephone operating companies. This adapter is able to be used in conjunction with, for example, an LTE modem with a USB connection to operate over presently operating telecommunications networks such as the widely deployed cellular 4G and 5G LTE networks.

In various examples, the combination of the below described systems and methods with an LTE modem is able to use a Voice over LTE (VoLTE) interface, as is provided by a suitable LTE modem, as a communications medium between a local POTS telephone device and remote communications systems. In an example, this combination is referred to as a POTS over LTE (PoLTE) adapter.

The below described systems and methods in an example include an adapter that is able to provide an interface to an existing POTS infrastructure by providing the loop voltage, line supervision, DTMF decoding, call progress tones, coding, transient protection and hybrid circuitry used to properly interface with and control communications sessions with the internal POTS infrastructure in a facility. This adapter in an example provides the electrical and signaling interface to the internal POTS infrastructure in the facility that had traditionally been provided by the public utility telephone company's POTS connection.

Additionally, in some examples, a wide audio bandwidth that is provided by the VoLTE connection provided by the below described systems and methods provides a high-quality audio connection with sufficient audio quality for the analog POTS lines installed in the existing facility to support reliable communications to remote locations by various analog voice or analog data modem communications devices that are installed in those existing facilities. For example, existing equipment such as Security Panels, Alarm Systems, Point Of Sale (POS) Terminals, Elevator call boxes, similar devices, or combinations of these, are able to continue to be used in the existing facility and will be able to communicate with remote systems via an audio communications link that has sufficient audio communications bandwidth and quality to support reliable communications.

In some instances, systems connected to the POTS infrastructure of an existing facility, such as Security Panels, Alarm Systems, POS Terminals, and the like, use analog data modems to communicate data over the analog voice channel of the POTS system. The voice channel provided by prior cellular based communications systems have audio bandwidth, spectral characteristics, and other characteristics that are unable to reliably support the data communications signaling used by analog data modems and the like of the equipment installed in existing facilities. The use of VoLTE cellular connections in the below described systems and methods supports an analog voice channel with characteristics that are able to support the signaling used by such analog data modems, and thus allows the continued use of installed equipment and obviates the expense of having to replace, upgrade, or both, the installed POTS based equipment that already exists and is operating in an existing facility.

FIG. 1 depicts a block diagram of a Plain Old Telephone Service (POTS) over LTE (PoLTE) service adapter system 100, according to an example. The illustrated PoLTE service adapter system 100 includes an RJ-11 adapter 112 and a data/VoLTE modem 114.

The RJ-11 adapter 112 includes an "RJ-11" jack 102 and a POTS to VoLTE (PoLTE) adapter 104. The RJ-11 jack 102 provides a connection to the user's POTS equipment in an existing facility from the PoLTE service adapter system 100. The RJ-11 jack 102 is an example of a foreign exchange service (FXS) port that provides a POTS two-wire electrical connection, with one wire referred to as "TIP" and the other as "RING," to the PoLTE service adapter system 100.

The POTS to VoLTE (PoLTE) adapter 104 includes a subscriber line interface circuit "SLIC" 120 and a microcontroller 122. The SLIC 120 provides a loop voltage (nominally 48V) and signaling or supervision signals to the POTS two-wire electrical connection on the RJ-11 jack 102. The SLIC 120 detects the on-hook and off-hook conditions by monitoring the loop current of the TIP/RING connection on the two-wire interface of the RJ-11 jack 102 to determine if the connected POTS device is "On-Hook" or "Off-Hook," which is an indication of whether one or more POTS devices is active or not. In addition, the SLIC 120 in an example converts the two-wire RJ-11 jack 102 to a four-wire analog signal via a hybrid circuit in the SLIC.

The SLIC 120 in various examples provides further analog signal processing of the analog signal which consists of, for example, level shifting, filtering, and buffering. Furthermore, the SLIC 120 provides Dual Tone Multiple Frequency, i.e., "DTMF," tone detection of DTMF signals that are produced by a user's POTS device connected to the RJ-11 jack 102. In addition to DTMF signaling, the SLIC 120 can be set to allow pulse dialing from the POTS device. The data derived from DTMF tone detection in an example is used to establish a call origination over the LTE network. The SLIC 120 in an example also converts bi-directional analog signals as are exchanged over the two-wire electrical connection of the RJ-11 jack 102 to a digital serial stream using Pulse Code Modulation (PCM). This digital PCM data is transferred in an example via a Serial Peripheral Interface (SPI) to the Microcontroller 122 for processing by an Applications Program Interface (API) running on the microcontroller 122.

The microcontroller 122 in an example performs a number of functions to support the operations of the PoLTE adapter 104. An Application Program Interface (API) running on the microcontroller 122 in an example provides numerous functions such as those described below.

In an example, the microcontroller 122 in an example implements an echo canceller that provides Line Echo Cancellation using an adaptive filter, typically a Finite Infinite Response with programmable filter coefficients, to compensate for an echo path delay, such as an inherent delay between an original sound and an echo sound between the loudspeaker and microphone. The microcontroller 122 in an example provides the following processing with regards to signals on the POTS line connected to the RJ-11 jack 102.

A) Control of AC/DC voltage generation by the SLIC 120 to support ringing and loop current generation over the POTS lines connected to the RJ-11 jack 102.

B) Control of tone generation for Dual Tone Multi Frequency (DTMF) by the SLIC 120 for use in dialing, call progress and dial-tone generation on the POTS line connected to the RJ-11 jack 102. In addition to using DTMF tones to convey dial digits to the phone state machine, they can also be used as an out-of-band signaling system by having the SLIC 120 handle the detection of tones and subsequent forwarding of the tone information to the outbound path, and the inbound detection of out-of-band DTMF signals and local generation of synthetic DTMF tones.

C) Pulse Dialing Detection as indicated by the interface with the SLIC 120.

D) Processing of DTMF decoding information for inbound calls and caller ID produced by the SLIC 120.

E) Control of ring cadence as produced by the SLIC 120 through the RJ-11 jack 102.

F) Monitoring of metering loop activity as reported by the SLIC 120 for idle and active calls.

G) Monitoring and control of call progress detection and signaling via the SLIC 120

H) In some examples, a PoLTE adapter 104 is able to additionally, or alternatively, support Frequency Shift Keying (FSK) modulation, such as is used in conventional Facsimile (Fax) communications or any similar equipment utilizing FSK signaling such as Security and Alarm panels. The PoLTE adapter 104 in such an example is able to implement, such as by processing in the microcontroller 122, fax detection and signaling modulation and demodulation (modem) processing for signals received via the RJ-11 jack 102 to implement a local fax transponder for equipment connected to the POTS line via the RJ-11 jack 102 so as to, for example, exchange facsimile information generated on the POTS line connected to the RJ-11 jack 102 with an IP based fax backend, an actual PCM/PSTN bridge, another system, or combinations of these. In addition to FSK modulation other forms of digital signaling are supported as an example Gaussian Frequency Shift Keying (GFSK), Minimum Shift Keying (MSK), and Audio Shift Keying (AFSK).

The PoLTE adapter 104 can provide diagnostic functionalities via its ability in an example to measure subtle electrical characteristics of the telephone network infrastructure that the POTS device is connected to via the Tip/Ring of the RJ-11 jack 102 and report this information to a remote management platform. In some examples, such reporting is performed via an Internet connection through the LTE cellular modem 126. In some examples, the microcontroller 122 performs or controls, without limitation and in conjunction with the SLIC 120, the following processing:

1) Measurement of Ringer Equivalence (REN). Ringer Equivalence is a measure that indicates the impedance present on the POTS line connected to the RJ-11 jack 102 as represented by a number of equivalent "ringer" circuits that are in parallel across the line. This number generally relates to a number of POTS devices that are connected to Tip/Ring on the RJ-11 jack 102.

2) Measurement of Loop Current. The microcontroller 122 in an example is able to control the operation of the SLIC 120 to measure the DC loop current that is present through the RJ-11 jack 102, and thus the facility's POTS infrastructure, for both "On Hook" and Off Hook" conditions.

3) Measurement of Loop Voltage. The microcontroller 122 in an example is able to control the operation of the SLIC 120 to measure the DC loop voltage that is present on the RJ-11 jack 102, and thus the facility's POTS infrastructure. This is the DC voltage supplied by the SLIC 120 to Tip/Ring of the RJ-11 jack 102.

4) Measurement of Line Impedance. The microcontroller 122 in an example is able to control the operation of the SLIC 120 to measure the impedance of the circuit that is connected to the RJ-11 jack 102, and thus of the facility's POTS infrastructure.

In an example, the microcontroller 122 uses an additional SPI interface with the SLIC 120 to exchange command-and-control data between the microcontroller 122 and the SLIC 120. The microcontroller 122 in an example also utilizes a full speed/high speed USB interface 106 to exchange commands and bi-directional commands, information and PCM audio data between the PoLTE adapter 104 and the cellular LTE router 108.

The cellular LTE router 108 includes a Micro-Controller Unit (Host MCU) 124 and an LTE cellular modem 126. The LTE cellular modem 126 utilizes main and diversity antennas 110 tuned to the appropriate LTE frequency bands for reception and transmission of LTE cellular signals The Host MCU 124 contains a microprocessor that executes firmware in external memory (RAM), which provides the initialization and control of all interfaces, such as the example of the USB 130 interface. The MCU firmware provides support for the APIs used in the system such as a USB Audio Device. The Host MCU 124 of the cellular LTE router 108 interfaces with the LTE cellular modem 126 to control the initialization, configuration, and operation of the LTE cellular modem 126. The Host MCU 124 of the cellular LTE router 108 in an example has a controller USB interface 130 that is connected to the USB interface 106. The controller USB interface 130 is able to exchange control and operational information, along with data packets containing all digitized analog signals between the Host MCU 124 and the PoLTE adapter 104.

In the event that the PoLTE adapter 104 detects a call origination from the POTS equipment connected to the RJ-11 jack 102, e.g., the POTS equipment has dialed a phone number, the microcontroller 122 sends an indication to the Host MCU 124 via the USB interface 106 indicating that a call has been initiated and also provides the telephone number that has been dialed. In response to receiving that indication, the Host MCU 124 commands the LTE cellular modem 126 to establish a VoLTE call over the LTE network to complete the end-to-end audio connection. Additionally, the Host MCU 124 receives indications of an inbound voice call from the LTE cellular modem 126 and connects the incoming call through the PoLTE adapter 104 to the POTS equipment connected to the RJ-11 jack 102.

When an LTE call is established either based on initiation by POTS equipment connected to the RJ-11 jack 102 dialing a number, or an indication of an incoming call from the LTE cellular modem 126, the Host MCU 124 in an example configures its controller USB interface 130 as a USB Audio Device (Class 1) to allow digital audio data packets exchanged with the PoLTE adapter 104 to be sent and received via the USB interface 106 between the Host MCU 124 and microcontroller 122. The Host MCU 124 in such an example routes the digital audio data packets exchanged with the PoLTE adapter 104 to the LTE cellular modem 126 in order that they can be conveyed over a VoLTE call.

In various examples, the LTE call is able to be connected directly to an intended receiver without an intermediate station receiving or processing that LTE call. For example, if the POTS equipment connected to the RJ-11 jack 102 dials a telephone number for a remote telephone device, the LTE call is established directly to that remote telephone device.

Call Processing

The PoLTE adapter 104 in an example can originate or terminate a voice call for both outbound and inbound calls. The processing associated with such operations is described below.

Inbound VoLTE Calls

Figure 2:
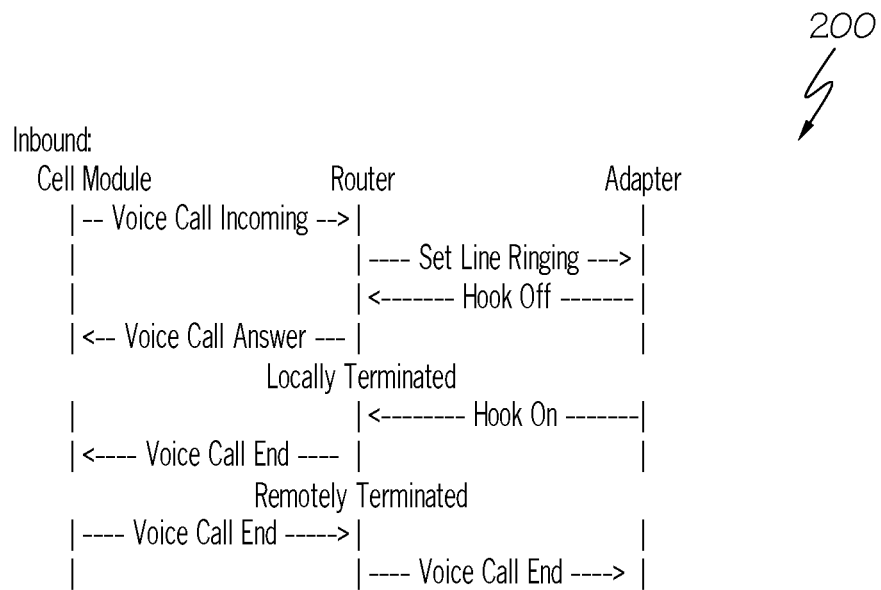
FIG. 2 illustrates inbound call processing, according to an example.

FIG. 2 illustrates inbound call processing 200, according to an example. The inbound call processing 200 illustrates processing performed when the LTE cellular modem 126 indicates to the Host MCU 124 that an incoming cellular call is being received. The LTE cellular modem 126 in an example is registered on the cellular network with an active SIM card in order to support Voice over LTE (VoLTE) communications. The LTE cellular modem 126 receives an inbound call from a remote caller device that has originated a voice call to the illustrated PoLTE service adapter system 100. The LTE cellular modem 126 sends a USB Line Control Message to the Host MCU 124 that indicates an incoming call. The Host MCU 124 then sends a message via the USB interface 106 to the PoLTE adapter 104 providing an indication of the incoming call.

The microcontroller 122 monitors the line condition of the local POTS device connected to the two-wire interface. Upon notification of receipt of an incoming call, the microcontroller 122 determines if the local POTS equipment connected to the RJ-11 jack 102 is in an acceptable state, such as "On-Hook" or "Ringing". If the local POTS equipment is in an acceptable state, a ring cadence is initiated on the two-wire interface of the RJ-11 jack 102 such as by sending an HID out report. The microcontroller 122 in an example controls the SLIC 120 to produce the ring cadence on the two-wire interface of the RJ-11 jack 102 for the local POTS equipment. Upon the detection of an "Off-Hook" condition by the local POTS device, the microcontroller 122 in an example sends a USB Line Control Message that describes the "Off-Hook" state, and simultaneously prepares the USB Audio Data Transfer. The microcontroller 122 and the Host MCU 124 create a bidirectional USB Audio Data Transfer Channel over the USB interface 106, and a bidirectional USB Audio Data Transfer Channel between the Host MCU 124 and the cellular module. The Host MCU 124 then sends a USB Modem Control Message to the cellular module to answer the inbound voice call. The VoLTE voice path between the two end POTS devices, the device(s) connected to the RJ-11 jack 102 and a remote calling device, is now completed.

Outbound VoLTE Calls

Figure 3:
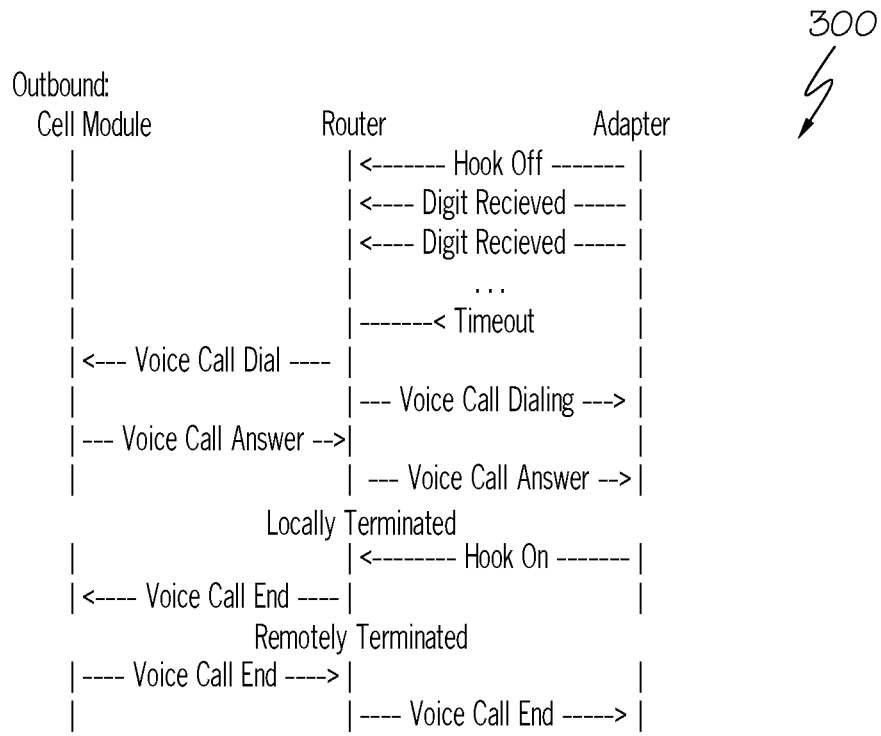
FIG. 3 illustrates outbound call processing, according to an example.

FIG. 3 illustrates outbound call processing 300, according to an example. The SLIC monitors the Tip/Ring loop current on the two-wire interface of the RJ-11 jack 102 to detect "On-Hook" or "Off-Hook" condition and report those conditions to the microcontroller 122. When an "Off-Hook" condition is detected, the microcontroller 122 sends a USB Line Event message to the Host MCU 124, via the USB interface 106, that indicates an outbound call is in progress. The microcontroller 122 in an example then determines if the SLIC detects a dial string of digits, which is a specification of a telephone number that can be either a DTMF string or a pulse stream. In an example, the microcontroller 122 sends USB Line Control messages to the Host MCU 124 via the USB interface 106, which contains the specification of the telephone number that indicates the reception of dial digits from the subscriber equipment. The Host MCU in an example uses a timer to collect the dial string in a buffer. Upon receiving each digit, the timer is reset. If the timer times out during the monitoring period, the Host MCU 124 compiles each received digit into an outbound phone number. The Host MCU 124 then sends a USB Modem Control message to the LTE cellular modem 126 to initiate a VoLTE voice call on the cellular LTE network. Upon the initiation of a call, call progress information sent by the LTE cellular modem 126 is monitored by the Host MCU 124. In an example, the LTE cellular modem 126 provides possible response strings that include at least: "unassigned (unallocated) number", "normal call clearing", "user busy", "no user responding", "call rejected", "destination out of order", "normal, unspecified", and "incompatible destination." Prior to the User Equipment (UE) on the destination answering the call, the microcontroller 122 commands the SLIC 120 to generate audible call progress tones to be produced for the local POTS equipment connected to the RJ-11 jack 102. The originating user using that local POTS equipment is thereby able to monitor the call progress. Upon detection of an indication of the SLIC 120 by the microcontroller 122 of an "On-Hook" condition at the originating POTS device, i.e., the local user "hangs up" the phone, the call is terminated by instructing the Host MCU 124 to send a USB Modem Control message to the LTE cellular modem 126.

Call Termination

Once a VoLTE call has been started according to one of the above processes, the voice call conversation can continue until either the remote party hangs up. If the remote caller terminates the call, the LTE cellular modem 126 sends an incoming 'End' call event to the Host MCU 124, and the Host MCU 124 sends a corresponding message to the microcontroller 122. If the local POTS equipment user puts the phone back onto the hook, the SLIC 120 reports this to the microcontroller 122 and the microcontroller 122 then sends a USB Line Control message via the USB interface 106 to the Host MCU 124 with the 'Hook On' condition set. In either case, the Host MCU 124 and microcontroller 122 provide control and notifications to the LTE cellular modem 126 and the SLIC 120, respectively, to place the illustrated PoLTE service adapter system 100 into an idle state that is ready for initiation of a new call.

Figure 4:
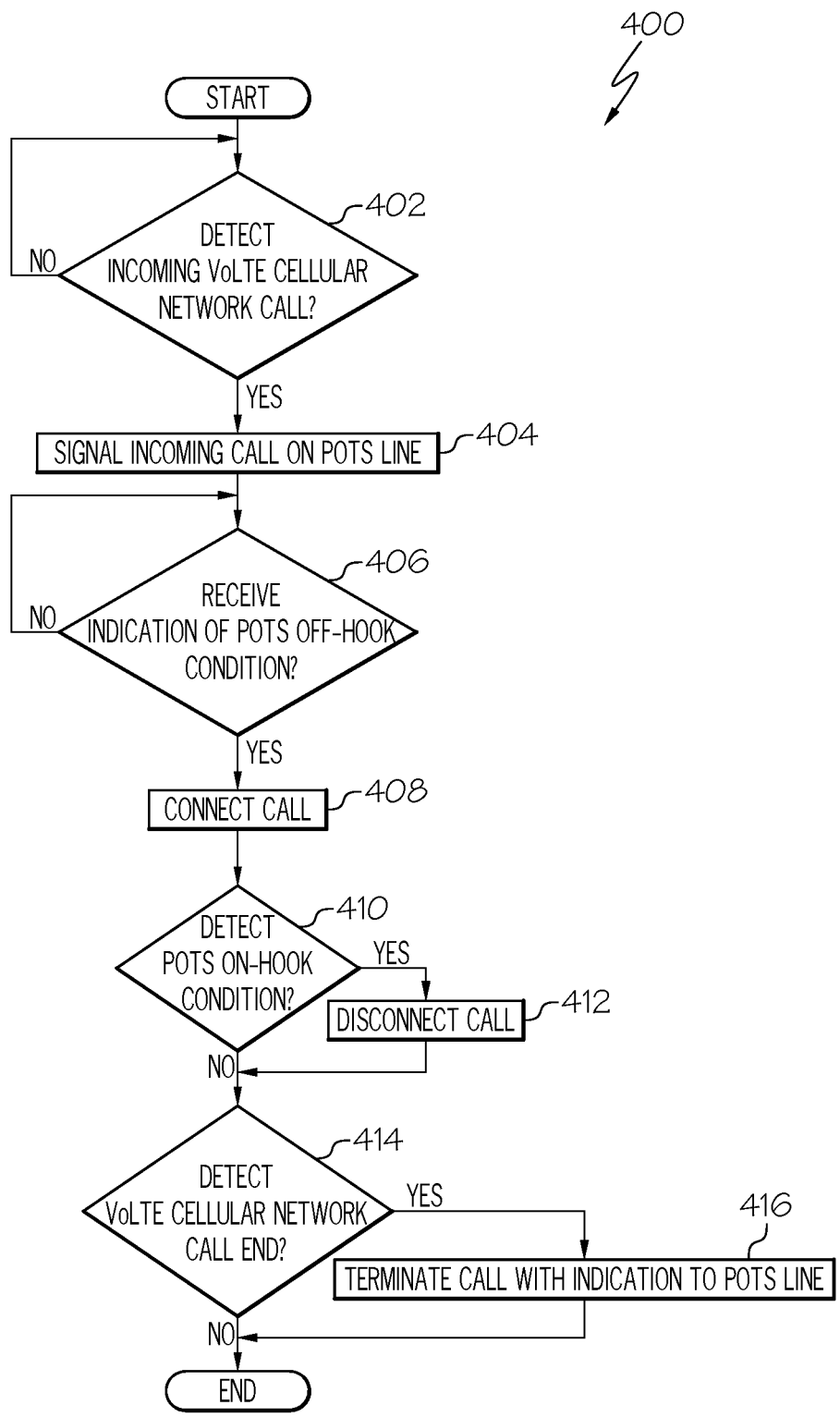
FIG. 4 illustrates an incoming VoLTE call processing flow, according to an example.

FIG. 4 illustrates an incoming VoLTE call processing flow 400, according to an example. The incoming call processing flow 400 in an example is performed by processing within the microcontroller 122, discussed above, based upon an indication by the LTE cellular modem 126 that in coming VoLTE call is being received from an external system connected to the LTE cellular modem via an LTE cellular data link.

The incoming call processing flow 400 monitors to detect, at 402, an incoming VoLTE Cellular network call. An indication of an incoming call is able to be received via an indication of an incoming VoLTE call via the LTE cellular modem 126 that is communicated to the microcontroller 122.

Based on detecting an incoming VoLTE call, an incoming call is signaled, at 404, on the POTS line. This signaling is able to be performed by the SLIC 120 based on control signals sent to the SLIC 120 from the microcontroller 122. Such signaling is able to include the SLIC 120 providing the ring voltage across the RJ-11 Jack 102.

Monitoring is performed to determine, at 406, if an indication of POTS off-hook condition is present on the POTS lines connected to the RJ-11 Jack 102. Such an off-hook condition indicates that the equipment connected to the POTS is accepting an incoming call. In an example, the SLIC 120 detects the off-hook condition and signals that condition to the microcontroller 122.

Upon detection of the off-hook condition, the VoLTE call, which is communicated to the microcontroller 122 from the LTE cellular modem 126, is connected, at 408, to the POTS line via the RJ-11 jack 102. Such a connection in an example is able to include performing data exchange by the microcontroller 122 between an interface to the LTE cellular modem 126 and an interface to the SLIC 120.

After connecting the VoLTE call, the POTS line is monitored to detect an on-hook condition, at 410. In general, equipment connected to the POTS line via the RJ-11 jack 102 places itself in an on-hook condition to indicate that the voice call is to be terminated. The SLIC 120 in an example detects this on-hook condition and communicates that detection to the microcontroller 122.

Upon detection of the on-hook condition, the call is disconnected, at 412. Disconnecting the call in an example includes the microcontroller 122 sending a signal to the LTE cellular modem 126 to end the VoLTE call.

After connecting the VoLTE call, signals are also from the LTE cellular modem 126 to detect, at 414, whether the VoLTE call has been terminated from the end connected via the LTE cellular modem 126.

Upon detection of termination of the VoLTE call from the LTE cellular modem 126, the termination of the call is signaled, at 416, on the POTS line connected to the RJ-11 jack 102. The termination of the call is signaled in an example by placing the POTS line connected to the RJ-11 jack 102 into an on-hook condition. The microcontroller 122 in an example controls the SLIC 120 to place that POTS line into an on-hook condition based on receiving the indication of the end of the VoLTE call.

Figure 5:
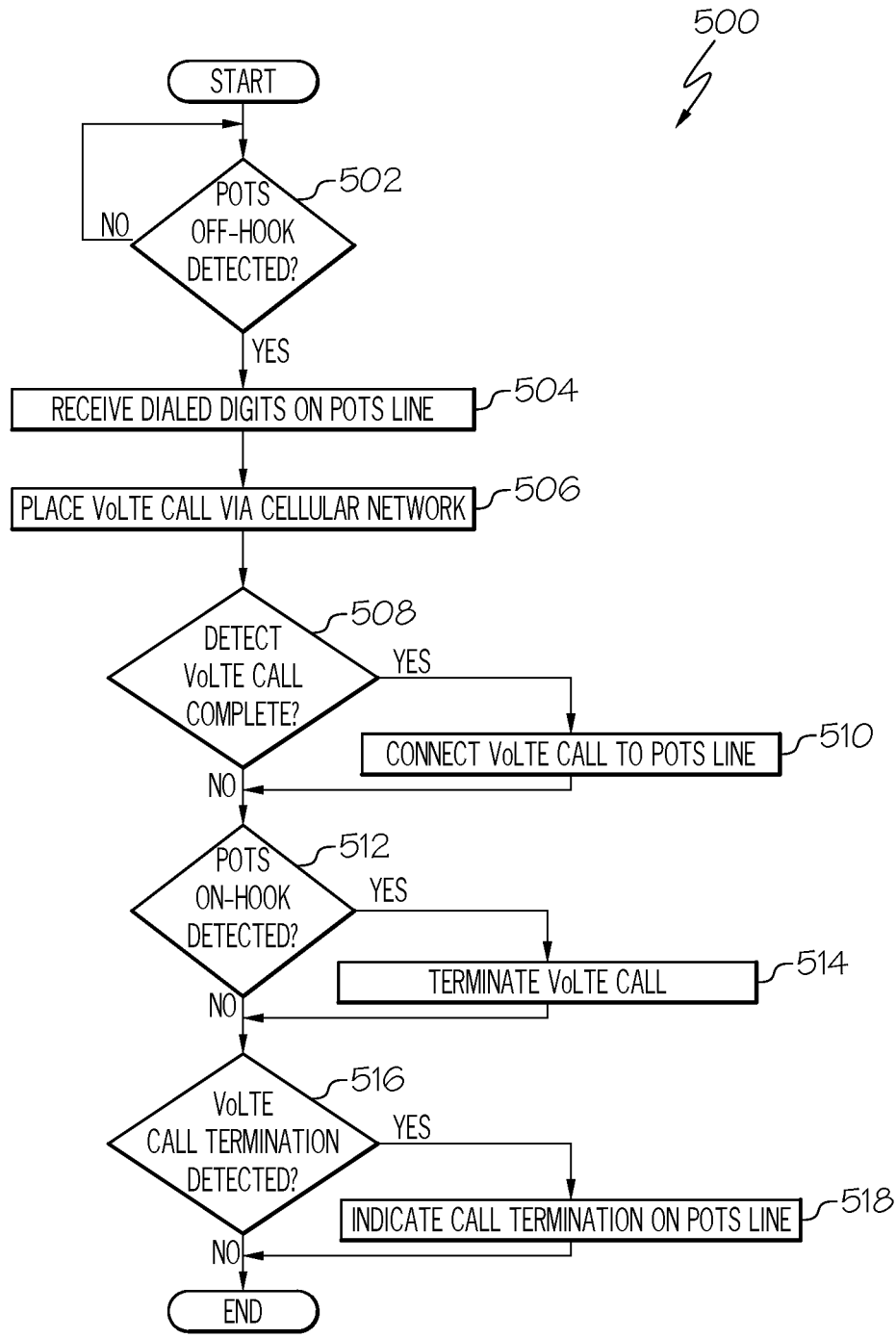
FIG. 5 illustrates a POTS initiated call processing flow, according to an example.

FIG. 5 illustrates a POTS initiated call processing flow 500, according to an example. The POTS initiated call processing flow 500 in an example is performed by processing within the microcontroller 122, discussed above.

The incoming call processing flow 500 monitors to detect, at 502, when the POTS line is placed into an off-hook condition. In an example, POTS equipment connected to the RJ-11 jack 102 will place the POTS line into an off-hook condition in order to initiate a call. The off-hook indication is detected in an example by the SLIC 120, which communicates an indication to the microcontroller 122.

After an off-hook condition is detected, dialed digits are received from the POTS equipment, at 504. The dialed digits are able to be in any suitable format, such as DTMF or pulsed signaling. The SLIC 120 detects the dialed digits in an example and provides that data to the microcontroller 122.

Based on detecting the off-hook condition and receiving the dialed digit information, a VoLTE call is placed, at 506, via the cellular network. The call in an example is placed by the microcontroller 122 sending a command to the LTE cellular modem 126 to place a VoLTE call to a destination that corresponds to the received dialed digits.

Monitoring is performed to determine, at 508, if the VoLTE call is complete. Determining that a VoLTE call is completed in an example is indicated by a message from the LTE cellular modem 126 that a remote system has accepted and is ready to conduct the VoLTE call. The completion of the VoLTE call in an example is indicated by the LTE cellular modem 126 sending an indication to the microcontroller 122.

Upon detection of the completion of the VoLTE call, the VoLTE call, which is communicated via the microcontroller 122 from the LTE cellular modem 126, is connected, at 510, to the POTS line via the SLIC 120 and the RJ-11 jack 102. Such a connection in an example is able to include performing data exchange by the microcontroller 122 between an interface to the LTE cellular modem 126 and an interface to the SLIC 120.

After connecting the VoLTE call, the POTS line is monitored to detect an on-hook condition, at 512. In general, equipment connected to the POTS line via the RJ-11 jack 102 places itself in an on-hook condition to indicate that the voice call is to be terminated. The SLIC 120 in an example detects this on-hook condition and communicates that detection to the microcontroller 122.

Upon detection of the on-hook condition, the VoLTE call is terminated, at 514. Termination of the VoLTE call in an example includes the microcontroller 122 sending a signal to the LTE cellular modem 126 to end the VoLTE call.

After connecting the VoLTE call, at 510, signals are also monitored from the LTE cellular modem 126 to detect, at 414, whether the VoLTE call has been terminated from the end connected via the LTE cellular modem 126.

Upon an indication of the detection of termination of the VoLTE call from the LTE cellular modem 126, the termination of the call is signaled, at 518, on the POTS line connected to the RJ-11 jack 102. The termination of the call is signaled in an example by placing the POTS line connected to the RJ-11 jack 102 into an on-hook condition. The microcontroller 122 in an example controls the SLIC 120 to place that POTS line into an on-hook condition based on receiving the indication of the end of the VoLTE call.

The above examples describe radio communications device that supports LTE cellular communications where, in an example, the radio communications device comprises at least the following components. 1) A data interface, such as the USB interface 106, configured to exchange modem control commands and audio data with an LTE cellular modem 126; 2) a telephone interface, such as the RJ-11 jack 102, configured to provide a two-wire analog telephone interface for connection to a telephone device; and 3) a controller that is configured to: control signals provided via the telephone interface to manage voice call operations with the telephone device, exchange digital voice data corresponding to voice signals exchanged with the telephone device via the telephone interface, and exchange control information via the data interface to establish and manage a voice over LTE cellular call.

Example PoLTE Adapter Processing Component Diagram

Figure 6:
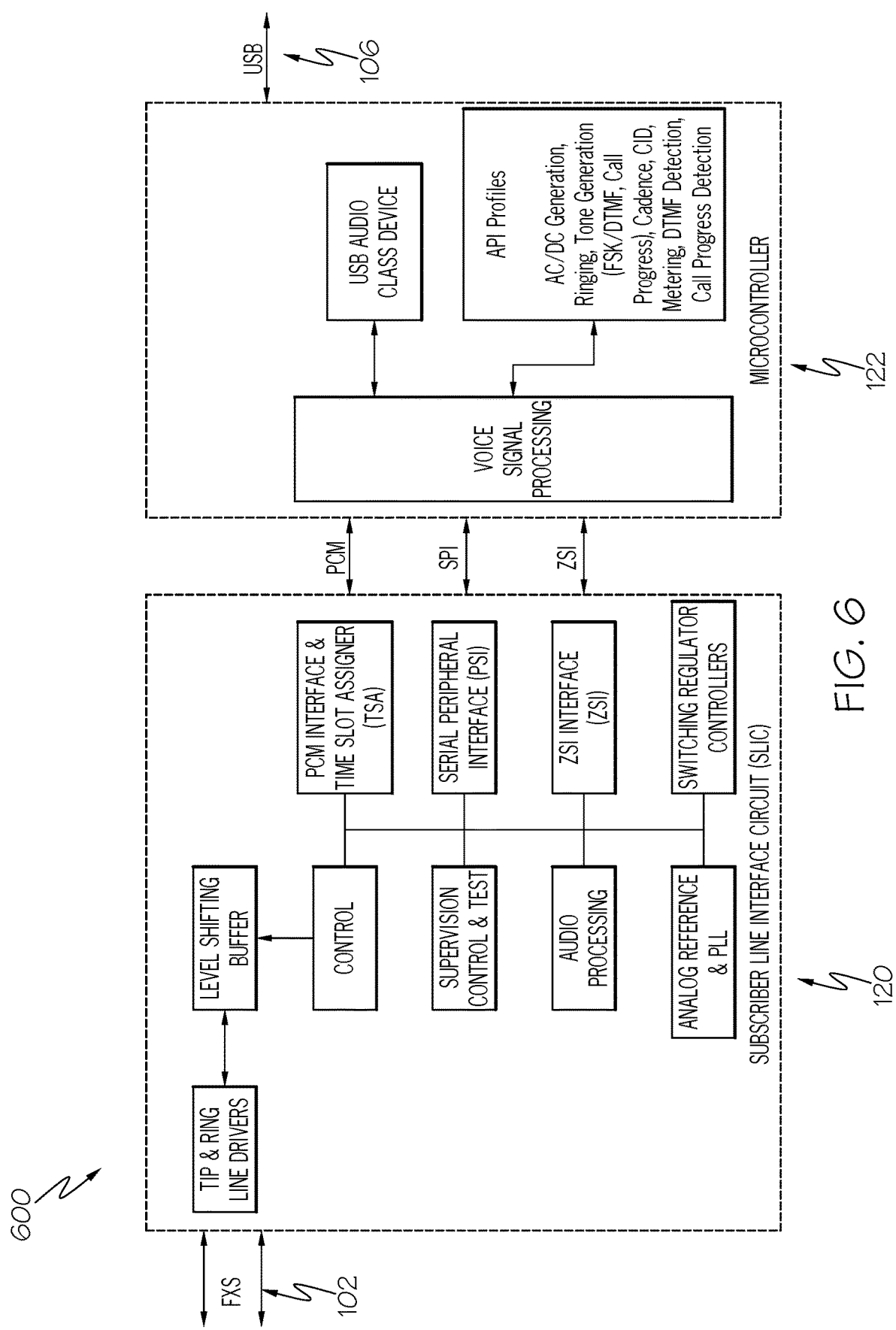
FIG. 6 illustrates processing components of a PoLTE adapter, according to an example.

FIG. 6 illustrates processing components of a PoLTE adapter 600, according to an example. The processing components of a PoLTE adapter 600 depict processing components that are found in an example PoLTE adapter 104 as is discussed above. Processing components of the SLIC 120 and the microcontroller 122 for one example are depicted along with the interfaces between the two as is discussed above. The RJ-11 jack 102, which in an example is an FXS interface as is discussed above, is an interface to the SLIC 120. The USB interface 106 is an interface to the microcontroller 122.

Figure 7:
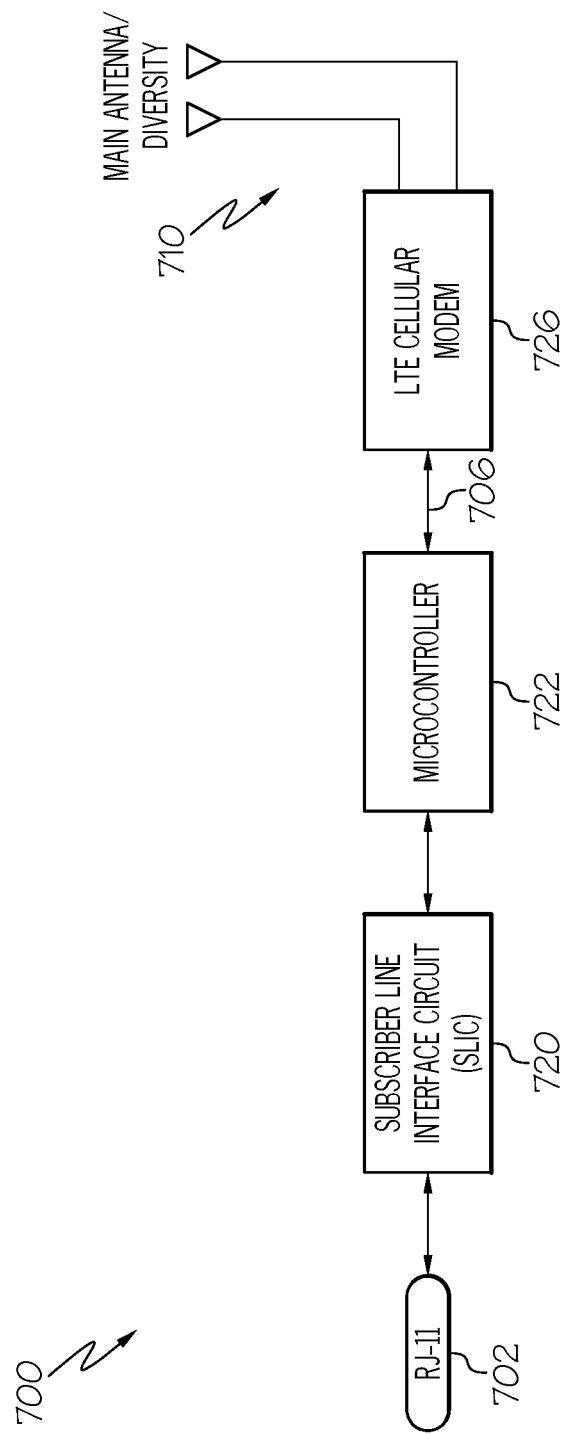
FIG. 7 illustrates an alternative block diagram of a Plain Old Telephone Service (POTS) over LTE (PoLTE) service adapter system, according to an example.

FIG. 7 illustrates an alternative block diagram of a Plain Old Telephone Service (POTS) over LTE (PoLTE) service adapter system 700, according to an example. The alternative block diagram of a Plain Old Telephone Service (POTS) over LTE (PoLTE) service adapter system 700 depicts components similar to those illustrated in the block diagram of a Plain Old Telephone Service (POTS) over LTE (PoLTE) service adapter system 100 discussed above.

A POTS interface via the RJ-11 jack 702 connects external POTS equipment (not shown) to the Subscriber Line Interface Circuit (SLIC) 720. The SLIC 720 is similar to the SLIC 120 discussed above. A microcontroller 722 performs the processing to support interconnections of voice channel calls between the SLIC 720 and LTE cellular modem 726. The microcontroller 722 in an example also utilizes a full speed/high speed USB interface 706 to exchange commands and bi-directional commands, information and PCM audio data between the microcontroller 722 and the cellular LTE modem 126. Processing performed by the microcontroller 722 is similar to the above described processing performed by the block diagram of a Plain Old Telephone Service (POTS) over LTE (PoLTE) service adapter system 100 to connect the SLIC 120 to the LTE Cellular Modem 126. The LTE cellular modem 726 performs wireless cellular communications in the illustrated example via the main antenna/diversity 710.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A radio communications device supporting 4G/5G Long Term Evolution (LTE) cellular communications, the radio communications device comprising:
 a data interface configured to exchange modem control commands and audio data with an LTE cellular modem;
 a telephone interface configured to provide a two-wire analog telephone interface for connection to a telephone device; and
 a controller configured to:
  exchange control signals via the telephone interface to manage voice call operations with the telephone device;
  exchange analog voice channel signals corresponding to digitally modulated voice channel signals exchanged with the telephone device via the telephone interface;
  convert signals between the analog voice channel signals and a Pulse Code Modulation (PCM) voice channel data stream;
  exchange control information with the LTE cellular modem via the data interface to establish and manage an LTE cellular session; and
  exchange the Pulse Code Modulation (PCM) voice channel data stream via the LTE cellular session via the LTE cellular modem.

2. The radio communications device of claim 1, where the controller is further configured to:
 receive a specification of a telephone number from the telephone device via the telephone interface; and
 establish the LTE cellular session directly to the telephone number.

3. The radio communications device of claim 1, further comprising an echo canceller that, when operating, provides Line Echo Cancellation to compensate for an echo path delay.

4. The radio communications device of claim 1, wherein the telephone interface is connected to equipment comprising at least one of security panels, alarm systems, Point of Sale (POS) terminals, or elevator call boxes, and the controller is configured to exchange the Pulse Code Modulation (PCM) voice channel data stream with the LTE cellular modem.

5. The radio communications device of claim 1, wherein the controller is further configured to:
 detect facsimile communications; and
 based on detecting facsimile communications, implement a local fax transponder.

6. A method of supporting Plain Old Telephone Service (POTS) over 4G/5G Long Term Evolution (LTE) cellular communications, the method comprising:
 exchanging control signals via a telephone interface to manage voice call operations with a telephone device, where the telephone interface is configured to provide a two-wire analog telephone interface for connection to the telephone device;
 exchanging analog voice channel signals corresponding to digitally modulated voice channel signals exchanged with the telephone device via the telephone interface;
 converting signals between the analog voice channel signals and a Pulse Code Modulation (PCM) voice channel data stream;
 exchanging control information with an LTE cellular modem via a data interface to establish and manage an LTE cellular session, where the data interface is configured to exchange modem control commands and audio data with an LTE cellular modem; and
 exchanging the Pulse Code Modulation (PCM) voice channel data stream via the LTE cellular session via the LTE cellular modem.

7. The method of claim 6, further comprising:
 receiving a specification of a telephone number from the telephone device via the telephone interface; and
 establishing the LTE cellular session directly to the telephone number.

8. The method of claim 6, further comprising providing Line Echo Cancellation compensating for an echo path delay.

9. The method of claim 6, wherein the telephone interface is connected to equipment comprising at least one of security panels, alarm systems, Point of Sale (POS) terminals, or elevator call boxes, and
 wherein exchanging the Pulse Code Modulation (PCM) voice channel data stream via the LTE cellular session via the LTE cellular modem comprises exchanging the Pulse Code Modulation (PCM) voice channel data stream over the LTE cellular modem.

10. The method of claim 6, further comprising:
 detecting facsimile communications; and
 based on detecting facsimile communications, implementing a local fax transponder.

11. A computer program product for of supporting Plain Old Telephone Service (POTS) over 4G/5G Long Term Evolution (LTE) cellular communications, the computer program product comprising:
 a non-transitory computer readable storage medium having computer readable program code embodied therewith, the computer readable program code comprising instructions for:
  exchanging control signals via a telephone interface to manage voice call operations with a telephone device, where the telephone interface is configured to provide a two-wire analog telephone interface for connection to the telephone device;
  exchanging analog voice channel signals corresponding to voice signals exchanged with the telephone device via the telephone interface;
  converting signals between the analog voice channel signals and a Pulse Code Modulation (PCM) voice channel data stream;
  exchanging control information with an LTE cellular modem via a data interface to establish and manage an LTE cellular session, where the data interface is configured to exchange modem control commands and audio data with an LTE cellular modem; and exchanging the Pulse Code Modulation (PCM) voice channel data stream via the LTE cellular session via the LTE cellular modem.

12. The computer program product of claim 11, wherein the computer readable program code further comprises instructions for:
receiving a specification of a telephone number from the telephone device via the telephone interface; and
establishing the LTE cellular session directly to the telephone number.

13. The computer program product of claim 11, wherein the computer readable program code further comprises instructions for providing Line Echo Cancellation compensating for an echo path delay.

14. The computer program product of claim 11, wherein the telephone interface is connected to equipment comprising at least one of security panels, alarm systems, Point of Sale (POS) terminals, or elevator call boxes, and
wherein exchanging the Pulse Code Modulation (PCM) voice channel data stream via the LTE cellular session via the LTE cellular modem comprises exchanging the Pulse Code Modulation (PCM) voice channel data stream via over the LTE cellular modem.

15. The computer program product of claim 11, wherein the computer readable program code further comprises instructions for:
detecting facsimile communications; and
based on detecting facsimile communications, implementing a local fax transponder.

16. The radio communications device of claim 1, wherein the controller is configured to, when operating, exchange the Pulse Code Modulation (PCM) voice channel data stream with the LTE cellular modem via a USB interface configured as a USB Audio Device.

17. The radio communications device of claim 1, further comprising an RJ-11 to USB adapter,
wherein the RJ-11 to USB adapter comprises the telephone interface and at least a first part of the controller, where the telephone interface comprises an RJ-11 interface, and
where the first part of the controller is configured to:
process control signals provided via the telephone interface to manage voice call operations with the telephone device;
exchange analog voice channel signals corresponding to digitally modulated voice channel signals exchanged with the telephone device via the telephone interface; and
convert signals between the analog voice channel signals and the Pulse Code Modulation (PCM) voice channel data stream, and
wherein the first part of the controller is further configured to exchange the Pulse Code Modulation (PCM) voice channel data stream via a USB data link.

18. The radio communications device of claim 1, wherein the analog voice channel signals comprise at least one of Dual Tone, Multiple Frequency (DTMF) or Frequency Shift Keying (FSK) signals received from an alarm/security panel, and
wherein the control signals to manage voice call operations comprise a specification of a telephone number to call, and wherein the controller is further configured to establish and manage the LTE cellular session by at least establishing a Voice over LTE (VoLTE) call directly to that telephone number; and
wherein the controller is configured to exchange the Pulse Code Modulation (PCM) voice channel data stream by at least transmitting the Pulse Code Modulation (PCM) voice channel data stream over via the VoLTE call.

19. The radio communications device of claim 1, wherein the digitally modulated voice channel signals comprise a voice channel signal modulated by a digital modulation format conveying digital data.

20. The radio communications device of claim 19,
wherein the digital modulation format comprises at least one of: frequency shift keying (FSK) modulation, Gaussian Frequency Shift Keying (GFSK), Minimum Shift Keying (MSK), and Audio Shift Keying (AFSK),
wherein the control signals to manage voice call operations comprise a specification of a telephone number to call, and wherein the controller is further configured to establish and manage the LTE cellular session by at least establishing an LTE call directly to that telephone number; and
wherein exchange of the Pulse Code Modulation (PCM) voice channel data stream comprises transmission of the Pulse Code Modulation (PCM) voice channel data stream via the LTE cellular session.

* * * * *